(12) United States Patent
Belcea

(10) Patent No.: US 6,728,545 B1
(45) Date of Patent: Apr. 27, 2004

(54) SYSTEM AND METHOD FOR COMPUTING THE LOCATION OF A MOBILE TERMINAL IN A WIRELESS COMMUNICATIONS NETWORK

(75) Inventor: John M. Belcea, West Melbourne, FL (US)

(73) Assignee: MeshNetworks, Inc., Maitland, FL (US)

(*) Notice: Subject to any disclaimer, the term of this patent is extended or adjusted under 35 U.S.C. 154(b) by 0 days.

(21) Appl. No.: 09/988,001

(22) Filed: Nov. 16, 2001

(51) Int. Cl.$^7$ .............................. H04Q 7/20; G01S 3/02
(52) U.S. Cl. ............................... 455/456.2; 455/456.1; 455/41.2; 455/457; 342/457; 342/357.06
(58) Field of Search ....................... 455/456.1, 2, 517, 455/561, 457, 524, 525, 676, 404.2, 422, 41.1, 41.2, 41.3; 370/241, 252, 331, 332, 333, 254, 347, 342, 441, 442; 342/457, 463, 357.06, 453, 454

(56) References Cited

U.S. PATENT DOCUMENTS

| | | | | |
|---|---|---|---|---|
| 4,494,192 | A | 1/1985 | Lew et al. ................... | 364/200 |
| 4,617,656 | A | 10/1986 | Kobayashi et al. ........... | 370/74 |
| 4,665,404 | A | * 5/1987 | Christy et al. .............. | 342/463 |
| 4,736,371 | A | 4/1988 | Tejima et al. ................. | 370/95 |
| 4,742,357 | A | 5/1988 | Rackley ....................... | 342/457 |
| 4,747,130 | A | 5/1988 | Ho .............................. | 379/269 |

(List continued on next page.)

FOREIGN PATENT DOCUMENTS

| | | |
|---|---|---|
| CA | 2132180 | 3/1996 |
| EP | 0513841 A3 | 11/1992 |
| EP | 0513841 A2 | 11/1992 |
| EP | 0627827 A2 | 12/1994 |
| EP | 0924890 A2 | 6/1999 |
| FR | 2683326 | 7/1993 |
| WO | WO 9608884 | 3/1996 |
| WO | WO 9724005 | 7/1997 |
| WO | WO 9839936 | 9/1998 |
| WO | WO 9912302 | 3/1999 |
| WO | WO 0034932 | 6/2000 |
| WO | WO 0110154 | 2/2001 |
| WO | WO 0133770 | 5/2001 |
| WO | WO 0135567 | 5/2001 |
| WO | WO 0137481 | 5/2001 |
| WO | WO 0137482 | 5/2001 |
| WO | WO 0137483 | 5/2001 |
| WO | WO 0235253 | 5/2002 |

OTHER PUBLICATIONS

Wong et al., "Soft Handoffs in CDMA Mobile Systems", Dec. 1997, IEEE Personal Communications.

(List continued on next page.)

Primary Examiner—Sinh Tran
Assistant Examiner—Kamran Afshar
(74) Attorney, Agent, or Firm—Roylance, Abrams, Berdo & Goodman, L.L.P.; Joseph J. Buczynski

(57) ABSTRACT

A system and method for computing the location of a mobile terminal in a wireless communications network, such as an ad-hoc wireless communications network. In particular, the system and method estimates the location of a mobile terminal in a wireless communications network, such as an ad-hoc terrestrial wireless communications network, based on estimated distances to a plurality of terrestrial reference terminals using error minimizing techniques, such as those based on Gauss's postulate. In doing so, the system and method estimate a respective distance from the mobile terminal to each of the reference terminals based on the respective signals received at the mobile terminal from the reference terminals, calculate a respective simulated pattern, such as a sphere or circle, about each of the respective reference terminals based on the respective distance from the terminal to each respective reference terminal and the respective locations of the respective reference terminals, estimates a location at which each of the simulated patterns intersect each other, and identifies the estimated location as representing the location of the terminal.

18 Claims, 2 Drawing Sheets

U.S. PATENT DOCUMENTS

| | | | |
|---|---|---|---|
| 4,910,521 A | | 3/1990 | Mellon .......................... 342/45 |
| 5,034,961 A | | 7/1991 | Adams ........................ 375/130 |
| 5,068,916 A | | 11/1991 | Harrison et al. ............... 455/39 |
| 5,155,490 A | * | 10/1992 | Spradley et al. ........ 342/357.03 |
| 5,231,634 A | | 7/1993 | Giles et al. ................. 370/95.1 |
| 5,233,604 A | | 8/1993 | Ahmadi et al. ............... 370/60 |
| 5,241,542 A | | 8/1993 | Natarajan et al. .......... 370/95.3 |
| 5,293,642 A | * | 3/1994 | Lo ........................... 455/456.2 |
| 5,293,645 A | * | 3/1994 | Sood ....................... 455/456.2 |
| 5,317,323 A | * | 5/1994 | Kennedy et al. ............. 342/457 |
| 5,317,566 A | | 5/1994 | Joshi ........................... 370/60 |
| 5,392,450 A | | 2/1995 | Nossen ...................... 455/12.1 |
| 5,412,654 A | * | 5/1995 | Perkins ...................... 455/11.1 |
| 5,424,747 A | | 6/1995 | Chazelas et al. ............... 342/70 |
| 5,502,722 A | | 3/1996 | Fulghum ................... 370/69.1 |
| 5,517,491 A | | 5/1996 | Nanni et al. ................... 370/29 |
| 5,555,425 A | | 9/1996 | Zeller et al. ................. 395/800 |
| 5,555,540 A | | 9/1996 | Radke ....................... 370/16.1 |
| 5,572,528 A | | 11/1996 | Shuen ..................... 370/85.13 |
| 5,615,212 A | | 3/1997 | Ruszczyk et al. ........... 370/433 |
| 5,618,045 A | | 4/1997 | Kagan et al. ................. 463/40 |
| 5,621,732 A | | 4/1997 | Osawa ......................... 370/79 |
| 5,623,495 A | | 4/1997 | Eng et al. ................... 370/397 |
| 5,627,976 A | | 5/1997 | McFarland et al. ......... 395/308 |
| 5,631,897 A | | 5/1997 | Pacheco et al. ............. 370/237 |
| 5,644,576 A | | 7/1997 | Bauchot et al. ............. 370/437 |
| 5,652,751 A | | 7/1997 | Sharony ..................... 370/227 |
| 5,663,990 A | * | 9/1997 | Bolgiano et al. ........... 375/138 |
| 5,680,392 A | | 10/1997 | Semaan ..................... 370/261 |
| 5,684,794 A | | 11/1997 | Lopez et al. ................ 370/337 |
| 5,687,194 A | | 11/1997 | Paneth et al. ............... 375/283 |
| 5,696,903 A | | 12/1997 | Mahany ................. 395/200.58 |
| 5,701,294 A | | 12/1997 | Ward et al. ................. 370/252 |
| 5,706,428 A | | 1/1998 | Boer et al. .................. 395/200 |
| 5,717,689 A | | 2/1998 | Ayanoglu ................... 370/349 |
| 5,736,964 A | * | 4/1998 | Ghosh et al. ............. 455/456.2 |
| 5,745,483 A | | 4/1998 | Nakagawa et al. ......... 370/335 |
| 5,774,876 A | | 6/1998 | Woolley et al. ............... 705/28 |
| 5,781,540 A | | 7/1998 | Malcolm et al. ............ 370/321 |
| 5,787,080 A | | 7/1998 | Hulyalkar et al. .......... 370/348 |
| 5,794,154 A | | 8/1998 | Bar-On et al. .............. 455/509 |
| 5,796,732 A | | 8/1998 | Mazzola et al. ............ 370/362 |
| 5,796,741 A | | 8/1998 | Saito et al. .................. 370/439 |
| 5,805,593 A | | 9/1998 | Busche ....................... 370/396 |
| 5,805,842 A | | 9/1998 | Nagaraj et al. ............. 395/306 |
| 5,805,977 A | | 9/1998 | Hill et al. .................. 455/31.3 |
| 5,809,518 A | | 9/1998 | Lee ............................ 711/115 |
| 5,822,309 A | | 10/1998 | Ayanoglu et al. ........... 370/315 |
| 5,844,905 A | | 12/1998 | McKay et al. .............. 370/443 |
| 5,845,097 A | | 12/1998 | Kang et al. ................. 395/297 |
| 5,857,084 A | | 1/1999 | Klein .......................... 395/309 |
| 5,870,350 A | | 2/1999 | Bertin et al. ................ 365/233 |
| 5,877,724 A | | 3/1999 | Davis ......................... 342/357 |
| 5,881,095 A | | 3/1999 | Cadd .......................... 375/202 |
| 5,881,372 A | | 3/1999 | Kruys ........................ 455/113 |
| 5,886,992 A | | 3/1999 | Raatikainen et al. ....... 370/410 |
| 5,896,561 A | | 4/1999 | Schrader et al. ........... 455/67.1 |
| 5,903,559 A | | 5/1999 | Acharya et al. ............ 370/355 |
| 5,907,809 A | * | 5/1999 | Molnar et al. ........... 455/456.2 |
| 5,909,651 A | | 6/1999 | Chander et al. ............ 455/466 |
| 5,936,953 A | | 8/1999 | Simmons ................... 370/364 |
| 5,943,322 A | | 8/1999 | Mayor et al. ............... 370/280 |
| 5,987,011 A | | 11/1999 | Toh ............................ 370/331 |
| 5,987,033 A | | 11/1999 | Boer et al. .................. 370/445 |
| 5,991,279 A | | 11/1999 | Haugli et al. ............... 370/311 |
| 6,028,853 A | | 2/2000 | Haartsen ..................... 370/338 |
| 6,029,217 A | | 2/2000 | Arimilli et al. ............. 710/107 |
| 6,034,542 A | | 3/2000 | Ridgeway .................... 326/39 |
| 6,044,062 A | | 3/2000 | Brownrigg et al. ......... 370/238 |
| 6,047,330 A | | 4/2000 | Stracke, Jr. ................. 709/238 |
| 6,052,594 A | | 4/2000 | Chuang et al. .............. 455/450 |
| 6,052,647 A | * | 4/2000 | Parkinson et al. ...... 342/357.06 |
| 6,052,752 A | | 4/2000 | Kwon ......................... 710/126 |
| 6,064,626 A | | 5/2000 | Stevens ...................... 365/233 |
| 6,067,291 A | | 5/2000 | Kamerman et al. ......... 370/338 |
| 6,078,566 A | | 6/2000 | Kikinis ....................... 370/286 |
| 6,104,712 A | | 8/2000 | Robert et al. ............... 370/389 |
| 6,108,738 A | | 8/2000 | Chambers et al. .......... 710/113 |
| 6,115,580 A | * | 9/2000 | Chuprun et al. ............... 455/1 |
| 6,122,690 A | | 9/2000 | Nannetti et al. ............ 710/102 |
| 6,130,881 A | | 10/2000 | Stiller et al. ................ 370/238 |
| 6,132,306 A | | 10/2000 | Trompower ................ 453/11.1 |
| 6,147,975 A | | 11/2000 | Bowman-Amuah ......... 370/252 |
| 6,163,699 A | | 12/2000 | Naor et al. .................. 455/453 |
| 6,178,337 B1 | | 1/2001 | Spartz et al. ............... 455/561 |
| 6,192,053 B1 | | 2/2001 | Angelico et al. ........... 370/448 |
| 6,192,230 B1 | | 2/2001 | Van Bokhorst et al. ..... 455/343 |
| 6,201,803 B1 | * | 3/2001 | Munday et al. ............. 370/350 |
| 6,208,870 B1 | | 3/2001 | Lorello et al. .............. 455/466 |
| 6,223,240 B1 | | 4/2001 | Odenwald et al. .......... 710/129 |
| 6,240,294 B1 | | 5/2001 | Hamilton et al. ........... 455/456 |
| 6,246,875 B1 | | 6/2001 | Seazholtz et al. ........... 455/432 |
| 6,249,516 B1 | | 6/2001 | Brownrigg et al. ......... 370/338 |
| 6,259,404 B1 | * | 7/2001 | Parl et al. ................... 342/457 |
| 6,275,707 B1 | | 8/2001 | Reed et al. ................. 455/456 |
| 6,285,892 B1 | | 9/2001 | Hulyalkar ................... 455/574 |
| 6,304,556 B1 | | 10/2001 | Haas .......................... 370/254 |
| 6,308,073 B1 | * | 10/2001 | Petty et al. ................. 455/456 |
| 6,327,300 B1 | | 12/2001 | Souissi et al. .............. 375/219 |
| 6,347,228 B1 | * | 2/2002 | Ludden et al. .............. 455/456 |
| 6,349,091 B1 | | 2/2002 | Li ............................... 370/238 |
| 6,349,210 B1 | | 2/2002 | Li ............................... 455/450 |
| 6,433,740 B1 | * | 8/2002 | Gilhousen ................... 342/442 |
| 6,453,168 B1 | | 9/2002 | McCrady et al. | |
| 6,486,831 B1 | | 11/2002 | Martorana et al. | |
| 6,539,231 B1 | | 3/2003 | Hamilton et al. | |
| 6,600,927 B2 | | 7/2003 | Hamilton et al. | |
| 2001/0053699 A1 | | 12/2001 | McCrady et al. ........... 455/513 |

OTHER PUBLICATIONS

Wong et al., "A Pattern Recognition System for Handoff Algorithms", Jul. 2000, IEEE Journal on Selected Areas in Communications, vol. 18, No. 7.

Andras G. Valko, "Cellular IP: A New Approach to Internet Host Mobility", Jan. 1999, ACM Computer Communication Review.

Richard North, Dale Bryan and Dennis Baker, "Wireless Networked Radios: Comparison of Military, Commercial, and R&D Protocols", Feb. 28–Mar. 3, 1999, $2^{nd}$ Annual UCSD Conference on Wireless Communications, San Diego CA.

Benjamin B. Peterson, Chris Kmiecik, Richard Hartnett, Patrick M. Thompson, Jose Mendoza and Hung Nguyen, "Spread Spectrum Indoor Geolocation", Aug. 1998, Navigation: Journal of the Institute of Navigation, vol. 45, No. 2, summer 1998.

Josh Broch, David A. Maltz, David B. Johnson, Yih–Chun Hu and Jorjeta Jetcheva, "A Performance Comparison of Multi–Hop Wireless Ad Hoc Network Routing Protocols", Oct. 25–30, 1998, Proceedings of the $4^{th}$ Annual ACM/IEEE International Conference on Mobile Computing and Networking.

C. David Young, "USAP: A Unifying Dynamic Distributed Multichannel TDMA Slot Assignment Protocol".

Chip Elliott and Bob Heile, "Self–Organizing, Self–Healing Wireless Networks", 2000 IEEE.

J.J. Garcia–Luna–Aceves and Asimakis Tzamaloukas, "Reversing the Collision–Avoidance Handshake in Wireless Networks".

J.J. Garcia–Luna–Aceves and Marcelo Spohn, "Transmission–Efficient Routing in Wireless Networks Using Link–State Information".

J.J. Garcia–Luna–Aceves and Ewerton L. Madruga, "The Core–Assisted Mesh Protocol", Aug. 1999, IEEE Journal on Selected Areas in Communications, vol. 17, No. 8.

Ad Kamerman and Guido Aben, "Net Throughput with IEEE 802.11 Wireless LANs".

J.R. McChesney and R.J. Saulitis, "Optimization of an Adaptive Link Control Protocol for Multimedia Packet Radio Networks".

Ram Ramanathan and Regina Rosales–Hain, "Topology Control of Multihop Wireless Networks using Transmit Power Adjustment".

Ram Ramanathan and Martha E. Steenstrup, "Hierarchically–Organized, Multihop Mobile Wireless Networks for Quality–of–Service Support".

Martha E. Steenstrup, "Dynamic Multipoint Virtual Circuits for Multimedia Traffic in Multihop Mobile Wireless Networks".

Zhenyu Tang and J.J. Garcia–Luna–Aceves, "Collision–Avoidance Transmission Scheduling for Ad–Hoc Networks".

George Vardakas and Wendell Kishaba, "QoS Networking With Adaptive Link Control and Tactical Multi–Channel Software Radios".

Publication by Nokia which can be found on the Nokia website at "www.nokia.com/press/background/pdf/mlbs.pdf".

"www.911dispatch.com/911_file/location_tech.html".

Document by IMA entitled "Mathematical Challenges in Global Positioning Systems (GPS)" which can be found at "www.ima.umn.edu/gps".

Document by Wendy J Woodbury Straight entitled "Exploring a New Reference System", which can be found at "menstorsoftwareince.com/profile/newref.html".

Document entitled "An Introduction to SnapTrac Server–Aided GPS Technology", which can be found at "www.snaptrack.com/pdf/ion.pdf".

* cited by examiner

SYSTEM AND METHOD FOR COMPUTING THE LOCATION OF A MOBILE TERMINAL IN A WIRELESS COMMUNICATIONS NETWORK

BACKGROUND OF THE INVENTION

1. Field of the Invention

The present invention relates to a system and method for computing the location of a mobile terminal in a wireless communications network, such as an ad-hoc wireless communications network. More particularly, the present invention relates to a system and method for computing the location of a mobile terminal in a wireless communications network, such as an ad-hoc terrestrial wireless communications network, based on estimated distances to a plurality of terrestrial reference terminals using error minimizing techniques, such as Gauss's postulate.

2. Description of the Related Art

Wireless communications networks, such as mobile wireless telephone networks, have become increasingly prevalent over the past decade. These wireless communications networks are commonly referred to as "cellular networks", because the network infrastructure is arranged to divide the service area into a plurality of regions called "cells".

Specifically, a terrestrial cellular network includes a plurality of interconnected base stations that are distributed geographically at designated locations throughout the service area. Each base station includes one or more transceivers that are capable of transmitting and receiving electromagnetic signals, such as radio frequency (RF) communications signals, to and from user terminals, such as wireless telephones, located in its coverage area. The communications signals include, for example, voice data that has been modulated according to a desired modulation technique and transmitted as data packets. As can be appreciated by one skilled in the art, the transceiver and user terminals transmit and receive the data packets in multiplexed format, such as time-division multiple access (TDMA) format, code-division multiple access (CDMA) format, or frequency-division multiple access (FDMA) format, which enables a single transceiver at the base station to communicate simultaneously with several user terminals in its coverage area.

In recent years, a type of mobile communications network known as an "ad-hoc" network has been developed for use by the military. In this type of network, each user terminal is capable of operating as a base station or router for the other user terminals, thus eliminating the need for a fixed infrastructure of base stations. Details of an ad-hoc network are set forth in U.S. Pat. No. 5,943,322 to Mayor, the entire content of which is incorporated herein by reference.

More sophisticated ad-hoc networks are also being developed which, in addition to enabling user terminals to communicate with each other as in a conventional ad-hoc network, further enable the user terminals to access a fixed network and thus communicate with other user terminals, such as those on the public switched telephone network (PSTN), and on other networks such as the Internet. Details of these types of ad-hoc networks are described in U.S. patent application Ser. No. 09/897,790 entitled "Ad Hoc Peer-to-Peer Mobile Radio Access System Interfaced to the PSTN and Cellular Networks", filed on Jun. 29, 2001, and in U.S. patent application Ser. No. 09/815,157 entitled "Time Division Protocol for an Ad-Hoc, Peer-to-Peer Radio Network Having Coordinating Channel Access to Shared Parallel Data Channels with Separate Reservation Channel", filed on Mar. 22, 2001, the entire content of both of said patent applications being incorporated herein by reference.

In either conventional wireless communications networks, or in ad-hoc wireless communications networks, it may be necessary or desirable for a user terminal to be capable of knowing or determining its geographic location. Different types of location determining services and techniques for wireless communications networks are described in a publication by Nokia which can be found on the Nokia website at "www.nokia.com/press/background/pdf/mlbs.pdf", the entire contents of which being incorporated herein by reference. In particular, the Nokia document states that location identification services are currently provided in wireless communications networks based on three major technologies. One of these technologies uses cell identification combined with Round Trip Time (RTT), Timing Advance (TA) and Measured Signal level (RX level), Time Difference of Arrival (TDOA) and Angle Of Arrival (AOA) techniques, the details of which can be appreciated by one skilled in the art. A second technology uses cellular signal timing based methods for code division multiple access (CDMA) and wideband code division multiple access (WCDMA). The third technology described in the Nokia document employs Global Positioning System (GPS) techniques.

Another list of methods and techniques currently used in the wireless communications industry for providing location services can be found at "www.911dispatch.com/911_file/location_tech.html", the entire contents of which being incorporated herein by reference. Although the GPS technique is the last technique mentioned in this list, it generally is viewed as being more accurate than all of the other methods. Further details and descriptions of GPS based methods are set forth in a publication by J. J. Spilker Jr. entitled "Satellite Constellation and Geometric Dilution of Precision" in "GPS—Theory and Applications", American Institute of Astronautics, Inc., 1996, in a publication by P. Axelrad et al. entitled "GPS Navigation Algorithms" in "GPS—Theory and Applications", American Institute of Astronautics, Inc., 1996, in a publication by Bradford W. Parkinson entitled "GPS Error Analysis" in "GPS—Theory and Applications", American Institute of Astronautics, 1996, and in a publication by N. Ashby et al. "Introduction to Relativistic Effects on the Global Positioning System" in "GPS—Theory and Applications", American Institute of Astronautics, 1996, the entire contents of each of these publications being incorporated herein by reference.

Despite the fact that the GPS technique has been in use for a considerable duration of time and most of the world's navigation relies on this technique, the GPS technique is very susceptible to errors in measurement. Therefore, the GPS technique is capable of providing location determination results with very high accuracy only after performing a relative large number of measurements to remove such errors. A description of the shortcomings of GPS is set forth in a document by IMA entitled "*Mathematical Challenges in Global Positioning Systems* (GPS)" which can be found at "www.ima.umn.edu/gps", the entire contents of this document being incorporated herein by reference. Certain other tests also demonstrate that the GPS technique is unsuitable for terrestrial-based networks.

In addition, other methods and techniques which do not use GPS satellites for determining mobile station locations in a wireless communications network typically require that the signal from the mobile station is received at at least two cell sites that can measure and process the delay between signals arrival, identify the direction of the signal based on "path signature" and determine the distance between mobile station and the cell towers. In all of these methods, the processing of the information is executed in a designated central processing unit (CPU) which is typically located at a cell tower next to the base station (BTS). Also, most of these methods were designed to comply with E911 requirements without requiring that excessive modifications be made to existing wireless communications systems. Examples of other location determining techniques are set forth in a document by CERN—European Organization for Nuclear Research, which can be found at "rkb.home.cern.ch/rkb/ANI16pp/node98.html#SECTION00098000000000000000", in a document by Wendy J Woodbury Straight entitled "Exploring a New Reference System", which can be found at "menstorsoftwareince.com/profile/newref.html", and in a document entitled "An Introduction to SnapTrac Server-Aided GPS Technology", which can be found at "www.snaptrack.com/pdf/ion.pdf", the entire contents of each of these documents being incorporated herein by reference.

Accordingly, a need exists for an improved system and method for determining the location of a mobile user terminal in a wireless communications network that substantially eliminate the drawbacks associated with existing location determining systems and methods, such as GPS.

SUMMARY OF THE INVENTION

An object of the present invention is to provide an improved system and method for computing the location of a mobile terminal in a wireless communications network, such as an ad-hoc wireless communications network.

Another object of the present invention is to provide a system and method for computing the location of a mobile terminal in a wireless communications network, such as an ad-hoc terrestrial wireless communications network, based on estimated distances to a plurality of terrestrial reference terminals using error minimizing techniques.

These and other objects are substantially achieved by providing a system and method for determining the location of a terminal in a wireless communications network. The system and method perform the operation of receiving respective signals from each of a plurality of reference terminals at the terminal, with each respective signal including information representing a location of its respective reference terminal. Specifically, the terminal receives the respective signals from at least four reference terminals, which can be terrestrial terminals. Also, the wireless communications network can be an ad-hoc wireless communications network, with the terminal and reference terminals being adapted to operate in the ad-hoc wireless communications network. The system and method further perform the operations of estimating a respective distance from the terminal to each of the reference terminals based on the respective signals received at the terminal, calculating a respective simulated pattern, such as a sphere or circle, about each of the respective reference terminals based on the respective distance from the terminal to each respective reference terminal and the respective locations of the respective reference terminals, estimating a location at which each of the simulated patterns intersect each other, and identifying the estimated location as representing the location of the terminal. When estimating the respective distances from the terminal to the reference terminals, the system and error can perform error minimizing techniques, such as those in accordance with Gauss's postulate.

BRIEF DESCRIPTION OF THE DRAWINGS

These and other objects, advantages and novel features of the invention will be more readily appreciated from the following detailed description when read in conjunction with the accompanying drawings, in which.

DETAILED DESCRIPTION OF THE PREFERRED EMBODIMENTS

Figure 1:
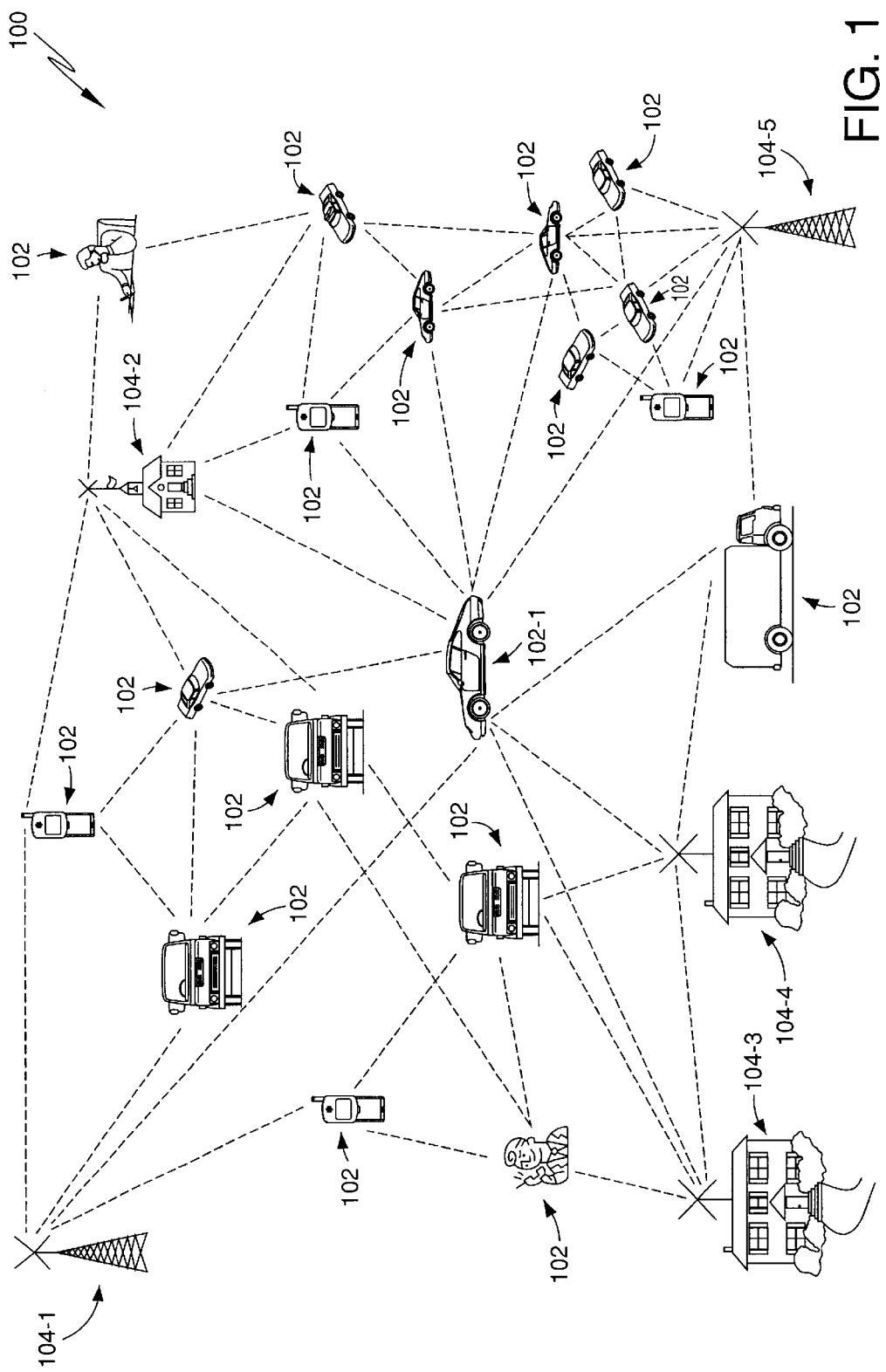
FIG. 1 is a conceptual block diagram of an example of an ad-hoc packet-switched wireless communications network employing a system and method for computing the location of a mobile terminal in the network according to an embodiment of the present invention.

FIG. 1 is a conceptual block diagram illustrating an example of an ad-hoc packet-switched wireless communications network 100 employing an embodiment of the present invention. Specifically, the network 100 includes a plurality of user terminals 102 which, as indicated, can be configured hand-held devices for use by an individual, and can also be deployed in homes or offices, or in vehicles such as automobiles, trucks and the like. User terminals 102 can be referred to generally as "mobile terminals" 102, because they can be mobile or stationary at any given time.

As further indicated, network 100 includes a plurality of fixed terminals 104-1 through 104-5 (referred to generally as fixed terminals 104), which always are stationary. These types of terminals can be fixed routers for routing data packets to other mobile terminals 102 or fixed terminals 104. Also, certain fixed terminals can be configured as intelligent access points (IAPs) for providing the user terminals 102 with access to a fixed network (not shown) which includes, for example, a core local access network (LAN) and a plurality of servers and gateway routers, to thus provide the mobile terminals 102 with access to other networks, such as the public switched telephone network (PSTN), other ad-hoc networks, and the Internet, to name a few. Although this example shows the network 100 as including five fixed terminals 104, the network 100 naturally would have as many fixed terminals 104 as deemed appropriate to adequately service the mobile terminals 102.

The mobile terminals 102 and fixed terminals 104 are capable of communicating with each other directly, or via one or more other mobile terminals 102 and/or fixed terminals 104 operating as a router or routers for data packets being sent between mobile terminals 102 or fixed terminals 104, as described in U.S. Pat. No. 5,943,322 to Mayor and in U.S. patent application Ser. Nos. 09/897,790 and 09/815,157, referenced above. That is, each mobile terminal 102 and fixed terminal 104 includes a transceiver which is capable of receiving and transmitting signals, such as packetized data signals, to and from itself under the control of a controller. The packetized data signals can include, for example, voice, data or multimedia.

Each mobile terminal 102 and fixed terminal 104 further includes a memory, such as a random access memory (RAM), that is capable of storing, among other things, routing information pertaining to itself and other mobile terminals 102 and fixed terminals 104 in the network 100. The mobile terminals 102 and fixed terminals 104 exchange their respective routing information, referred to as routing advertisements or routing table information, with each other via a broadcasting mechanism periodically, for example, when a new mobile terminal 102 enters the network 100, or when existing mobile terminals 102 in the network 100 move. A mobile terminal 102 or fixed terminal 104 will broadcast its routing table updates, and nearby mobile terminals 102 and fixed terminals 104 will only receive the broadcast routing table updates if within radio frequency (RF) range of the broadcasting mobile terminal 102 or fixed terminal 104.

Each of the mobile terminals 102 and fixed terminals 104 that receive the routing table information from the broadcasting mobile terminal 102 or fixed terminal 104 can store all or a relevant portion of that routing table information in their respective memory. Typically, each mobile terminal 102 and fixed terminal 104 will perform a pruning operation to reduce the amount of routing table information that it stores in its memory as can be appreciated by one skilled in the art. It is also noted that when a mobile terminal 102 or fixed terminal 104 broadcasts the routing table information to its neighboring mobile terminals 102 and/or fixed terminals 104, the broadcasting mobile terminal 102 or fixed terminal 104 can include routing table information pertaining to some or all of its neighboring mobile terminals 102 and/or fixed terminals 104 that it has previously received from them and has stored in its memory. Accordingly, a mobile terminal 102 or fixed terminal 104 receiving the broadcast routing table information from a mobile terminal 102 or fixed terminal 104 also receives some information pertaining to the routing capabilities of the neighbors of that other mobile terminal 102 or fixed terminal 104.

In addition, mobile terminals 102 and fixed terminals 104 in the network 100 have the capability to measure with high precision the propagation time of radio signals between the terminals 102 and 104. Based on this information and known positions of fixed terminals, such as LAPs, routers and other network members, one mobile terminal 102 can compute its geographic location coordinates with high accuracy as will now be described.

In the network 100, the fixed terminals 104 have their locations measured at high accuracy at the time of their installation in the network 100. From time to time, the fixed terminals 104 broadcast location messages communicating their location to other mobile terminals 102 and fixed terminals 104 within their RF range. Each mobile terminal 102 that can receive the location messages from at least four other fixed terminals 104 or mobile terminals 102 can compute their positions. Also, the accuracy of the location calculation increases as the number of received location messages increases. As can be appreciated by one skilled in the art, in order for a mobile terminal 102 to compute its own position, the mobile terminal 102 must know the propagation time of the radio signals received from a particular fixed terminals 104 or mobile terminals 102, and the coordinates of that fixed or mobile terminal that has transmitted the signals. A method for accurately measuring the signal propagation time is described in copending U.S. patent application Ser. No. 09/815,157, referenced above. Once a mobile terminal 102 has computed its position, it can broadcast a location message communicating its position to other members of the network 100, such as to other mobile terminals 102 and fixed terminals 104. The information can thus be used by other mobile terminals 102 to enable them to compute their locations.

Figure 2:
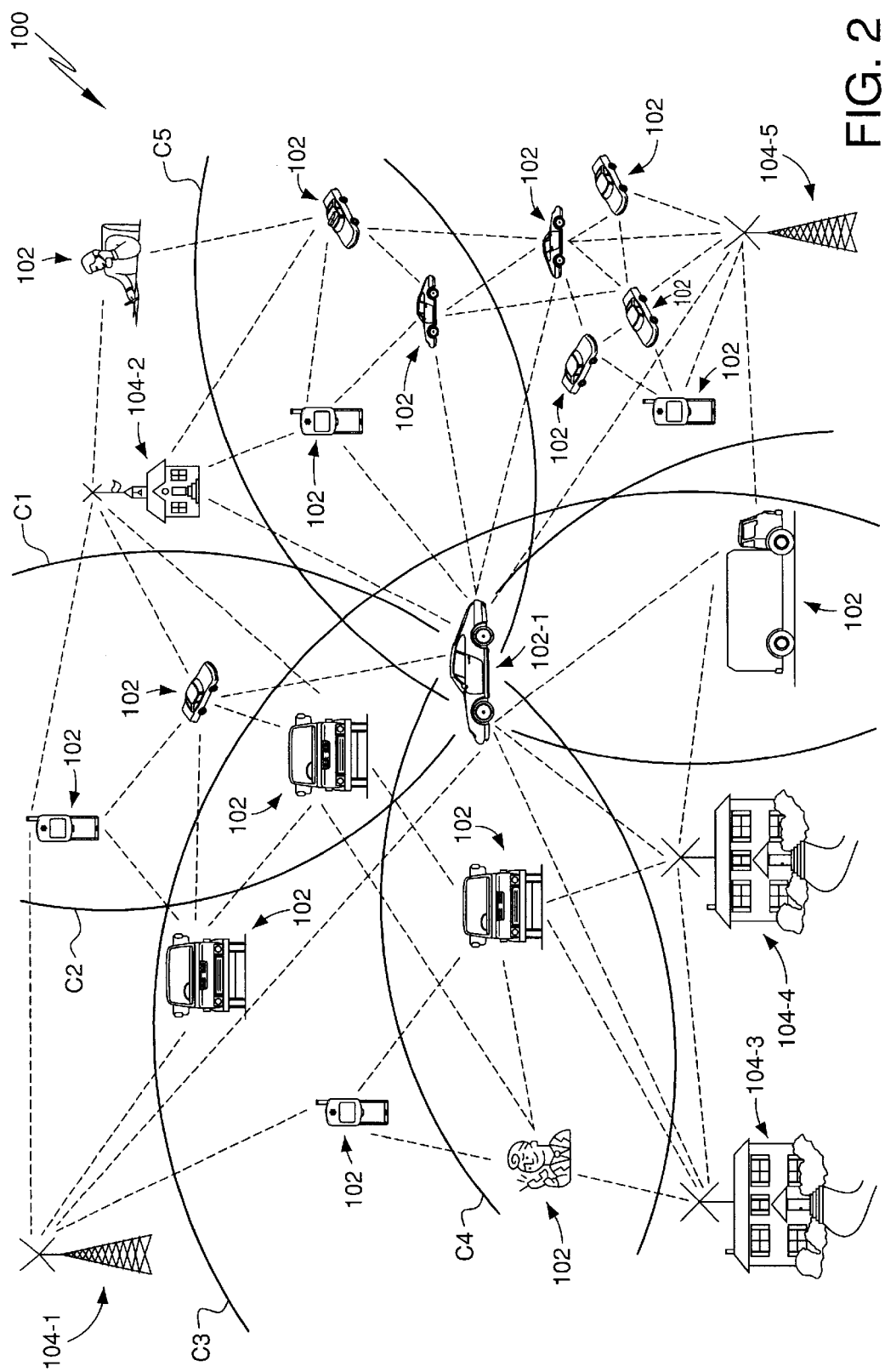
FIG. 2 is a conceptual block diagram illustrating an example of a technique that a mobile terminal in the network shown in FIG. 1 can use to determine its location according to an embodiment of the present invention.

An example in which a mobile terminal 102 in a car (identified specifically as mobile terminal 102-1) can determine its own location using a system and method according to an embodiment of the present invention will now be described in more detail with reference to FIG. 2. As indicated in this example, mobile terminal 102-1 can receive location messages transmitted by all five fixed terminals 104-1 through 104-5 and can determine the respective distances to each of the fixed terminals 104-1 through 104-5. Based on the distance to each of these five fixed terminals 104-1 through 104-5, the calculations performed by the mobile terminal 102-1 simulate a respective pattern (e.g., a sphere or circle) C1 through C5 around each of the fixed terminals 104-1 through 104-5 based on the respective distances to each of the respective fixed terminals 104-1 through 104-5. For illustrative purposes, FIG. 2 shows the patterns C1 through C5 as being circular shaped. However, in actuality, the patterns are three-dimensional and thus spherical in shape to take into account longitude, latitude and altitude. The calculation then attempts to determine the location at which these five circles intersect. However, because the measurements such as the distances to the fixed terminals 104-1 and 104-5 and the information representing the locations of fixed stations 104-1 through 104-5 can be affected by unknown errors, the intersection of the five patterns C1 through C5 may not exist. Accordingly, the technique performed by the mobile terminal 102-1 according to an embodiment of the present invention estimates the most probable location of the mobile terminal 102-1.

As will now be demonstrated by the following equations and explanation, the technique that the user terminal 102-1 performs to determine its location according to an embodiment of the present invention is based on Gauss's postulate which holds that the most probable approximation of a measure is that which minimizes the sum of square of errors. The mathematical formulation of the technique takes into account that mobile terminal 102-1 has recorded known positions $(x_i, y_i, z_i)$ of n neighbors (e.g., n fixed terminals 104) and the respective distance $r_i$ to each of them. The technique thus calculates the position of the mobile terminal 102-1 as a point of coordinates (x, y, z).

If measurements are not affected by any error and the computation is correct, the position (x, y, z) of the mobile terminal 102-1 must fulfill the system of n equations:

$$\sqrt{(x-x_i)^2 + (y-y_i)^2 + (z-z_i)^2} - r_i = 0 \text{ for } i = 1, 2, \dots, n \qquad (1)$$

Each member of equation (1) can be represented graphically as a sphere centered in $(x_i, y_i, z_i)$ with radius $r_i$. In the example shown in FIG. 2, sphere C1 (shown in two-dimensions as a circle) surrounding fixed terminal 104-1 would have its coordinates centered at $(x_1, y_1, z_1)$ with radius $r_1$ being the distance from fixed terminal 104-1 to mobile terminal 102-1, sphere C2 surrounding fixed terminal 104-2 would have its coordinates centered at $(x_2, y_2, z_2)$ with radius $r_2$ being the distance from fixed terminal 104-2 to mobile terminal 102-1, and so on. Ideally, all n spheres C1 through C5 must be intersecting in one point, namely, the location of the mobile terminal 102-1 performing the computation. However, in reality, because $r_i$ and $(x_i, y_i, z_i)$ are affected by measurement errors as discussed above, these spheres C1 through C5 will not all intersect in one point, but will pass close to the real position of the mobile terminal 102-1.

The distances from a point of coordinates (x, y, z) to all n supporting terminals can be computed in accordance with equation (2) as follows:

$$\rho_i(x, y, z) = \sqrt{(x-x_i)^2 + (y-y_i)^2 + (z-z_i)^2} \text{ for } i = 1, 2, \ldots, n \quad (2)$$

For any point of coordinates (x, y, z), the differences between the computed distances $\rho_i$ and the measured distances $r_i$ are determined in accordance with equation (3):

$$\epsilon_i(x,y,z) = \rho_i(x,y,z) - r_i \text{ for } i=1,2,\ldots,n. \quad (3)$$

In the graphical representation shown in FIG. 2, the system of equation (3) provides the distance of the point of coordinates (x, y, z) to each of the n spheres. In equation (3) $r_i$ are measured numerical values, while $\rho_i$ are functions of the point coordinates (x, y, z). It means that the errors $\epsilon_i$ are also functions of the same coordinates.

The sum of squares of errors $\epsilon_i$ becomes also a function of mobile station position as presented in equation (4)

$$E(x, y, z) = \sum_{i=1}^{n} \epsilon_i^2(x, y, z) \quad (4)$$

In accordance with Gauss's postulate, the most probable position of the mobile station E(x, y, z) is the one that minimizes the value of the E(x, y, z) function. In the point (x, y, z) where the function E(x, y, z) has the minimum value, all partial derivative must be zero. After writing the equations for finding the point where the derivative are zero and considering linear approximations of the quadratic equations, the following relationships can be obtained in the system of equations (5) as follows:

$$\begin{cases} \sum_{i=1}^{n} \left(\frac{r_i}{\rho_i(x_0, y_0, z_0)}\left(\left(\frac{x_0-x_i}{\rho_i(x_0, y_0, z_0)}\right)^2 - 1\right) + 1\right)\delta x + \sum_{i=1}^{n} \left(\frac{(x_0-x_i)(y_0-y_i)r_i}{\rho_i^3(x_0, y_0, z_0)}\right)\delta y + \sum_{i=1}^{n} \left(\frac{(x_0-x_i)(z_0-z_i)r_i}{\rho_i^3(x_0, y_0, z_0)}\right)\delta z = -\sum_{i=1}^{n} \left((\rho_i(x_0, y_0, z_0) - r_i)\frac{x_0-x_i}{\rho_i(x_0, y_0, z_0)}\right) \\ \sum_{i=1}^{n} \left(\frac{(y_0-y_i)(x_0-x_i)r_i}{\rho_i^3(x_0, y_0, z_0)}\right)\delta x + \sum_{i=1}^{n} \left(\frac{r_i}{\rho_i(x_0, y_0, z_0)}\left(\left(\frac{y_0-y_i}{\rho_i(x_0, y_0, z_0)}\right)^2 - 1\right) + 1\right)\delta y + \sum_{i=1}^{n} \left(\frac{(y_0-y_i)(z_0-z_i)r_i}{\rho_i^3(x_0, y_0, z_0)}\right)\delta z = -\sum_{i=1}^{n} \left((\rho_i(x_0, y_0, z_0) - r_i)\frac{y_0-y_i}{\rho_i(x_0, y_0, z_0)}\right) \\ \sum_{i=1}^{n} \left(\frac{(z_0-z_i)(x_0-x_i)r_i}{\rho_i^3(x_0, y_0, z_0)}\right)\delta x + \sum_{i=1}^{n} \left(\frac{(z_0-z_i)(y_0-y_i)r_i}{\rho_i^3(x_0, y_0, z_0)}\right)\delta y + \sum_{i=1}^{n} \left(\frac{r_i}{\rho_i(x_0, y_0, z_0)}\left(\left(\frac{z_0-z_i}{\rho_i(x_0, y_0, z_0)}\right)^2 - 1\right) + 1\right)\delta z = -\sum_{i=1}^{n} \left((\rho_i(x_0, y_0, z_0) - r_i)\frac{z_0-z_i}{\rho_i(x_0, y_0, z_0)}\right) \end{cases} \quad (5)$$

The system of equations (5) has three unknown variables $\delta x$, $\delta y$, $\delta z$, which are the corrections to be applied to the current approximation $(x_0, y_0, z_0)$ of the mobile terminal for improving its position estimate. This means that after estimating the mobile terminal position $(x_0, y_0, z_0)$, the system of equations (5) is used for computing the corrections $\delta x$, $\delta y$ and $\delta z$. The improved estimated position is then computed in accordance with the following equations (6)

$$x_0' = x_0 + \delta x \quad (6)$$
$$y_0' = y_0 + \delta y$$
$$z_0' = z_0 + \delta z$$

The system of equations (5) is used again for finding new corrections $\delta x$, $\delta y$, $\delta z$. This process continues iteratively until the computed corrections are smaller than the accepted error. As can be appreciated by one skilled in the art, Gauss's "Law of Propagation of Errors" gives the value of standard deviation of errors $\sigma$ of a multiple variable function in relation with standard deviation of errors for each variable $\sigma_x$, $\sigma_y$, $\sigma_z$ is as follows:

$$\sigma^2 = \left(\frac{\partial f}{\partial x}\right)^2 \sigma_x^2 + \left(\frac{\partial f}{\partial y}\right)^2 \sigma_y^2 + \left(\frac{\partial f}{\partial z}\right)^2 \sigma_z^2 \quad (7)$$

Another expression of standard deviation of distance errors derived from equation (4) is:

$$\sigma^2 = \frac{E(x, y, z)}{n - 3} \quad (8)$$

In this equation, the nominator n-3 represents the number of degree of freedom of the system of data. The term E(x, y, z) is defined in equation (4) above. Equation (8) thus provides the value of $\sigma^2$ as function of (x, y, z). Since the position (x, y, z) of the mobile is computed to minimize E(x, y, z), the computed position of mobile minimizes also the value of $\sigma^2$ when n>3.

As stated above, the measured elements are the distances from the mobile terminal 102-1 to all other reference stations, which in this example are the fixed terminals 104-1 through 104-5. By replacing the partial derivative in (7) with distance derivatives, the following equation is obtained:

$$\sigma^2 = \left(\frac{x-x_i}{\rho_i}\right)^2 \sigma_x^2 + \left(\frac{y-y_i}{\rho_i}\right)^2 \sigma_y^2 + \left(\frac{z-z_i}{\rho_i}\right)^2 \sigma_z^2 \text{ for } i = 1, 2, \ldots n \quad (9)$$

In this equation, the terms in parenthesis represent the unitary vectors of directions from the mobile station 102-1 to all supporting stations which, in this example, are fixed terminals 104-1 through 104-5. By replacing (x, y, z) with the coordinates $(x_0, y_0, z_0)$ of mobile terminal 102-1 and $\sigma^2$ with its value computed in (7), a system of n linear equations with three unknown variables $\sigma_x^2$, $\sigma_y^2$ and $\sigma_z^2$ is obtained, which represents the standard deviations along axes.

$$\frac{E(x, y, z)}{n-3} = \left(\frac{x_0-x_i}{\rho_i}\right)^2 \sigma_x^2 + \left(\frac{y_0-y_i}{\rho_i}\right)^2 \sigma_y^2 + \left(\frac{z_0-z_i}{\rho_i}\right)^2 \sigma_z^2 \text{ for } i = 1, 2, \ldots n \quad (10)$$

The least squares method (LSM) is used for solving this system and finding the standard deviation along each axis. When the reference stations (fixed terminals 104-1 through 104-5) are very far from the mobile terminal 102-1, the measured distance $r_i$ and the approximated distance $\rho_i$ are very high. In a GPS system, for example, the distance to satellites is about 26,000 Km, which means that:

$$\frac{r_i}{\rho_i(x_0, y_0, z_0)} \approx 1 \text{ for } i = 1, 2, \ldots, n \quad (11)$$

As indicated, equation (11) is not a real equality. However, if $\rho_i$ is approximated with an error of, for example, 10 Km, the left-hand side of equation (11) will equal 1 taken to the third decimal place. For instance, assuming that the measured distance to the satellite is 26152 Km, and based on a current approximation of the mobile position, the computed distance is off by 10 Km, then the computed distance is 26142 Km. When these values are entered into equation (11) as follows, the result is $$\frac{r}{\rho(x, y, z)} = \frac{26152}{26142} = 1.0004$$

or almost one. This demonstrates that the technique according to the embodiment of the present invention as described above can be used in a GPS scenario. In other words, the technique described above is more general than the GPS technique, and the GPS technique can be derived from this method under special conditions, such as very long distances to reference satellites. Accordingly, the system of equations (11) can be used to obtain the following system of equations:

$$\begin{cases} \sum_{i=1}^{n} \left(\frac{x_0 - x_i}{\rho_i(x_0, y_0, z_0)}\right)^2 \delta x + \sum_{i=1}^{n} \left(\frac{(x_0 - x_i)(y_0 - y_i)}{\rho_i^2(x_0, y_0, z_0)}\right) \delta y + \sum_{i=1}^{n} \left(\frac{(x_0 - x_i)(z_0 - z_i)}{\rho_i^2(x_0, y_0, z_0)}\right) \delta z = -\sum_{i=1}^{n} \left((\rho_i(x_0, y_0, z_0) - r_i)\frac{x_0 - x_i}{\rho_i(x_0, y_0, z_0)}\right) \\ \sum_{i=1}^{n} \left(\frac{(y_0 - y_i)(x_0 - x_i)}{\rho_i^2(x_0, y_0, z_0)}\right) \delta x + \sum_{i=1}^{n} \left(\frac{y_0 - y_i}{\rho_i(x_0, y_0, z_0)}\right)^2 \delta y + \sum_{i=1}^{n} \left(\frac{(y_0 - y_i)(z_0 - z_i)}{\rho_i^2(x_0, y_0, z_0)}\right) \delta z = -\sum_{i=1}^{n} \left((\rho_i(x_0, y_0, z_0) - r_i)\frac{y_0 - y_i}{\rho_i(x_0, y_0, z_0)}\right) \\ \sum_{i=1}^{n} \left(\frac{(z_0 - z_i)(x_0 - x_i)}{\rho_i^2(x_0, y_0, z_0)}\right) \delta x + \sum_{i=1}^{n} \left(\frac{(z_0 - z_i)(y_0 - y_i)}{\rho_i^2(x_0, y_0, z_0)}\right) \delta y + \sum_{i=1}^{n} \left(\frac{z_0 - z_i}{\rho_i(x_0, y_0, z_0)}\right)^2 \delta z = -\sum_{i=1}^{n} \left((\rho_i(x_0, y_0, z_0) - r_i)\frac{z_0 - z_i}{\rho_i(x_0, y_0, z_0)}\right) \end{cases} \quad (12)$$

It is noted that the publication by J. J. Spilker, referenced above, presents the system of equations (12) as a preferred method for computing the positions of mobile GPS receivers. This suggests that the technique described above can also be used for computing the location of mobile GPS receivers, and not only to compute the location of mobile terminals of a terrestrial-based systems.

As can also be appreciated from the above, the technique according to an embodiment of the present invention measures the distances of a mobile terminal to a plurality of terrestrial fixed terminals and computes the location of the mobile terminal based on those distances. On the other hand, GPS methods measure the distances from a mobile station to a set of satellites and compute the location of the mobile station based on these distances. Also, GPS solves the linear approximation of the multiple circles intersection, while the technique described above according to an embodiment of the present invention computes the most probable intersection point of the spheres (e.g., spheres C1 through C5) to compute the location of a mobile terminal.

Accordingly, if the technique described above were to be used in a satellite-based network in which the reference stations (e.g. satellites) are located very far from the mobile terminal, the technique would provide results similar to the GPS techniques. However, for terrestrial applications, when the reference stations (e.g., fixed stations 104-1 through 104-5) are relatively close to the mobile terminal 102-1, the GPS technique fails to provide any suitable result. Accordingly, the technique described above is far superior to GPS for determining the location of a mobile terminal in a terrestrial-based network.

Although only a few exemplary embodiments of the present invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims.

What is claimed is:

1. A method for determining the location of a terminal in a wireless communications network, comprising:
   receiving respective signals from each of at least four reference terminals at said terminal, each said respective signal including information representing a location of its respective said reference terminal;
   estimating a respective distance from said terminal to each of said reference terminals based on said respective signals received at said terminal;
   calculating a respective simulated pattern about each of said respective reference terminals based on said respective estimated distance from said terminal to each said respective reference terminal and said respective locations of said respective reference terminals;
   estimating a location at which each of said simulated patterns have the smallest error in their respective estimated distance, and identifying said estimated location as representing the location of said terminal; and
   performing error minimizing calculations based on Gauss's postulate to minimize sum of square errors in estimating said location.

2. A method as claimed in claim 1, wherein said reference terminals are each terrestrial terminals.

3. A method as claimed in claim 1, wherein said network includes an ad-hoc network, and said terminal and said reference terminals are adapted to operate in said ad-hoc network.

4. A method as claimed in claim 1, wherein each of said patterns is spherical.

5. A method as claim ed in claim 3, wherein said terminal is a mobile terminal.

6. A system for determining the location of a terminal in a wireless communications network, comprising:
   a receiver, adapted to receive respective signals from each of at least four reference terminals at said terminal, each said respective signal including information representing a location of its respective said reference terminal; and
   a processor, adapted to estimate a respective distance from said terminal to each of said reference terminals based on said respective signals received at said terminal, calculate a respective simulated pattern about each of said respective reference terminals based on said respective estimated distance from said terminal to each said respective reference terminal and said respective locations of said respective reference terminals, estimate a location at which each of said simulated patterns have the smallest error in their respective estimated distance, identify said estimated location as representing the location of said terminal, and perform error minimizing calculations based on Gauss's postulate to minimize sum of square errors in estimating said location.

7. A system as claimed in claim 6, wherein
said reference terminals are each terrestrial terminals.

8. A system as claimed in claim 6, wherein
said network includes an ad-hoc network, and said terminal and said reference terminals are adapted to operate in said ad-hoc network.

9. A system as claimed in claim 6, wherein
each of said patterns is spherical.

10. A system as claimed in claim 8, wherein said terminal is a mobile terminal.

11. A computer-readable medium of instructions for determining the location of a terminal in a wireless communications network, comprising:
  a first set of instructions, adapted to estimate a respective distance from said terminal to each of at least four reference terminals based on respective signals received at said terminal from each of a plurality of reference terminals, each said respective signal including information representing a location of its respective said reference terminal; a second set of instructions, adapted to calculate a respective simulated pattern about each of said respective reference terminals based on said respective estimated distance from said terminal to each said respective reference terminal and said respective locations of said respective reference terminals; and
  a third set of instructions, adapted to estimate a location at which each of said simulated patterns have the smallest error in their respective estimated distance, identify said estimated location as representing the location of said terminal, and perform error minimizing calculations based on Gauss's postulate to minimize sum of square errors in estimating said location.

12. A computer-readable medium of instructions as claimed in claim 11, wherein said reference terminals are each terrestrial terminals.

13. A computer-readable medium of instructions as claimed in claim 11, wherein said network includes an ad-hoc network, and said terminal and said reference terminals are adapted to operate in said ad-hoc network.

14. A computer-readable medium of instructions as claimed in claim 11, wherein
each of said patterns is spherical.

15. A computer readable medium of instructions as claimed in claim 13, wherein said terminal is a mobile terminal.

16. A method for determining the location of a terminal in a wireless communications network, comprising:
  receiving respective signals from each of a plurality of reference terminals at said terminal, each said respective signal including information representing a location of its respective said reference terminal;
  estimating a respective distance from said terminal to each of said reference terminals based on said respective signals received at said terminal;
  calculating a respective simulated pattern about each of said respective reference terminals based on said respective estimated distance from said terminal to each said respective reference terminal and said respective locations of said respective reference terminals; and
  estimating a location at which each of said simulated patterns have the smallest error in their respective estimated distance, and identifying said estimated location as representing the location of said terminal;
  wherein the smallest error is determined in the location estimating step based on the following equations:

$$\begin{cases} \sum_{i=1}^{n} \left( \frac{r_i}{\rho_i(x_0, y_0, z_0)} \left( \left( \frac{x_0 - x_i}{\rho_i(x_0, y_0, z_0)} \right)^2 - 1 \right) + 1 \right) \delta x + \sum_{i=1}^{n} \left( \frac{(x_0 - x_i)(y_0 - y_i)r_i}{\rho_i^3(x_0, y_0, z_0)} \right) \delta y + \sum_{i=1}^{n} \left( \frac{(x_0 - x_i)(z_0 - z_i)r_i}{\rho_i^3(x_0, y_0, z_0)} \right) \delta z = -\sum_{i=1}^{n} \left( (\rho_i(x_0, y_0, z_0) - r_i) \frac{x_0 - x_i}{\rho_i(x_0, y_0, z_0)} \right) \\ \sum_{i=1}^{n} \left( \frac{(y_0 - y_i)(x_0 - x_i)r_i}{\rho_i^3(x_0, y_0, z_0)} \right) \delta x + \sum_{i=1}^{n} \left( \frac{r_i}{\rho_i(x_0, y_0, z_0)} \left( \left( \frac{y_0 - y_i}{\rho_i(x_0, y_0, z_0)} \right)^2 - 1 \right) + 1 \right) \delta y + \sum_{i=1}^{n} \left( \frac{(y_0 - y_i)(z_0 - z_i)r_i}{\rho_i^3(x_0, y_0, z_0)} \right) \delta z = -\sum_{i=1}^{n} \left( (\rho_i(x_0, y_0, z_0) - r_i) \frac{y_0 - y_i}{\rho_i(x_0, y_0, z_0)} \right) \\ \sum_{i=1}^{n} \left( \frac{(z_0 - z_i)(x_0 - x_i)r_i}{\rho_i^3(x_0, y_0, z_0)} \right) \delta x + \sum_{i=1}^{n} \left( \frac{(z_0 - z_i)(y_0 - y_i)r_i}{\rho_i^3(x_0, y_0, z_0)} \right) \delta y + \sum_{i=1}^{n} \left( \frac{r_i}{\rho_i(x_0, y_0, z_0)} \left( \left( \frac{z_0 - z_i}{\rho_i(x_0, y_0, z_0)} \right)^2 - 1 \right) + 1 \right) \delta z = -\sum_{i=1}^{n} \left( (\rho_i(x_0, y_0, z_0) - r_i) \frac{z_0 - z_i}{\rho_i(x_0, y_0, z_0)} \right) \end{cases}$$

where three unknown variables $\delta x$, $\delta y$, $\delta z$, represent corrections to be applied to an estimation of the location of said terminal represented by coordinates $(x_0, y_0, z_0)$.

17. A system for determining the location of a terminal in a wireless communications network, comprising:
  a receiver, adapted to receive respective signals from each of a plurality of reference terminals at said terminal, each said respective signal including information representing a location of its respective said reference terminal; and
  a processor, adapted to estimate a respective distance from said terminal to each of said reference terminals based on said respective signals received at said terminal, calculate a respective simulated pattern about each of said respective reference terminals based on said respective estimated distance from said terminal to each said respective reference terminal and said respective locations of said respective reference terminals, estimate a location at which each of said simulated patterns have the smallest error in their respective estimated distance, and identify said estimated location as representing the location of said terminal;

wherein the smallest error is determined in the location estimating based on the following equations:

$$\begin{cases} \sum_{i=1}^{n} \left(\frac{r_i}{\rho_i(x_0, y_0, z_0)}\left(\left(\frac{x_0 - x_i}{\rho_i(x_0, y_0, z_0)}\right)^2 - 1\right) + 1\right)\delta x + \sum_{i=1}^{n} \left(\frac{(x_0 - x_i)(y_0 - y_i)r_i}{\rho_i^3(x_0, y_0, z_0)}\right)\delta y + \sum_{i=1}^{n} \left(\frac{(x_0 - x_i)(z_0 - z_i)r_i}{\rho_i^3(x_0, y_0, z_0)}\right)\delta z = -\sum_{i=1}^{n} \left((\rho_i(x_0, y_0, z_0) - r_i)\frac{x_0 - x_i}{\rho_i(x_0, y_0, z_0)}\right) \\ \sum_{i=1}^{n} \left(\frac{(y_0 - y_i)(x_0 - x_i)r_i}{\rho_i^3(x_0, y_0, z_0)}\right)\delta x + \sum_{i=1}^{n} \left(\frac{r_i}{\rho_i(x_0, y_0, z_0)}\left(\left(\frac{y_0 - y_i}{\rho_i(x_0, y_0, z_0)}\right)^2 - 1\right) + 1\right)\delta y + \sum_{i=1}^{n} \left(\frac{(y_0 - y_i)(z_0 - z_i)r_i}{\rho_i^3(x_0, y_0, z_0)}\right)\delta z = -\sum_{i=1}^{n} \left((\rho_i(x_0, y_0, z_0) - r_i)\frac{y_0 - y_i}{\rho_i(x_0, y_0, z_0)}\right) \\ \sum_{i=1}^{n} \left(\frac{(z_0 - z_i)(x_0 - x_i)r_i}{\rho_i^3(x_0, y_0, z_0)}\right)\delta x + \sum_{i=1}^{n} \left(\frac{(z_0 - z_i)(y_0 - y_i)r_i}{\rho_i^3(x_0, y_0, z_0)}\right)\delta y + \sum_{i=1}^{n} \left(\frac{r_i}{\rho_i(x_0, y_0, z_0)}\left(\left(\frac{z_0 - z_i}{\rho_i(x_0, y_0, z_0)}\right)^2 - 1\right) + 1\right)\delta z = -\sum_{i=1}^{n} \left((\rho_i(x_0, y_0, z_0) - r_i)\frac{z_0 - z_i}{\rho_i(x_0, y_0, z_0)}\right) \end{cases}$$

where three unknown variables $\delta x$, $\delta y$, $\delta z$, represent corrections to be applied to an estimation of the location of said terminal represented by coordinates $(x_0, y_0, z_0)$.

18. A computer readable medium of instructions for determining the location of a terminal in a wireless communications network, comprising:

a first set of instructions, adapted to estimate a respective distance from said terminal to each of a plurality of reference terminals based on respective signals received at said terminal from each of a plurality of reference terminals, each said respective signal including information representing a location of its respective said reference terminal;

a second set of instructions, adapted to calculate a respective simulated pattern about each of said respective reference terminals based on said respective estimated distance from said terminal to each said respective reference terminal and said respective locations of said respective reference terminals; and a third set of instructions, adapted to estimate a location at which each of said simulated patterns have the smallest error in their respective estimated distance, and identifying said estimated location as representing the location of said terminal;

wherein the smallest error is determined in the location estimating based on the following equations:

$$\begin{cases} \sum_{i=1}^{n} \left(\frac{r_i}{\rho_i(x_0, y_0, z_0)}\left(\left(\frac{x_0 - x_i}{\rho_i(x_0, y_0, z_0)}\right)^2 - 1\right) + 1\right)\delta x + \sum_{i=1}^{n} \left(\frac{(x_0 - x_i)(y_0 - y_i)r_i}{\rho_i^3(x_0, y_0, z_0)}\right)\delta y + \sum_{i=1}^{n} \left(\frac{(x_0 - x_i)(z_0 - z_i)r_i}{\rho_i^3(x_0, y_0, z_0)}\right)\delta z = -\sum_{i=1}^{n} \left((\rho_i(x_0, y_0, z_0) - r_i)\frac{x_0 - x_i}{\rho_i(x_0, y_0, z_0)}\right) \\ \sum_{i=1}^{n} \left(\frac{(y_0 - y_i)(x_0 - x_i)r_i}{\rho_i^3(x_0, y_0, z_0)}\right)\delta x + \sum_{i=1}^{n} \left(\frac{r_i}{\rho_i(x_0, y_0, z_0)}\left(\left(\frac{y_0 - y_i}{\rho_i(x_0, y_0, z_0)}\right)^2 - 1\right) + 1\right)\delta y + \sum_{i=1}^{n} \left(\frac{(y_0 - y_i)(z_0 - z_i)r_i}{\rho_i^3(x_0, y_0, z_0)}\right)\delta z = -\sum_{i=1}^{n} \left((\rho_i(x_0, y_0, z_0) - r_i)\frac{y_0 - y_i}{\rho_i(x_0, y_0, z_0)}\right) \\ \sum_{i=1}^{n} \left(\frac{(z_0 - z_i)(x_0 - x_i)r_i}{\rho_i^3(x_0, y_0, z_0)}\right)\delta x + \sum_{i=1}^{n} \left(\frac{(z_0 - z_i)(y_0 - y_i)r_i}{\rho_i^3(x_0, y_0, z_0)}\right)\delta y + \sum_{i=1}^{n} \left(\frac{r_i}{\rho_i(x_0, y_0, z_0)}\left(\left(\frac{z_0 - z_i}{\rho_i(x_0, y_0, z_0)}\right)^2 - 1\right) + 1\right)\delta z = -\sum_{i=1}^{n} \left((\rho_i(x_0, y_0, z_0) - r_i)\frac{z_0 - z_i}{\rho_i(x_0, y_0, z_0)}\right) \end{cases}$$

where three unknown variables $\delta x$, $\delta y$, $\delta z$, represent corrections to be applied to an estimation of the location of said terminal represented by coordinates $(x_0, y_0, z_0)$.

* * * * *